(12) United States Patent
Huang et al.

(10) Patent No.: US 11,892,692 B2
(45) Date of Patent: Feb. 6, 2024

(54) LIGHT RECEIVING AND EMITTING DEVICE

(71) Applicant: CLOUD LIGHT TECHNOLOGY LIMITED, Hong Kong (HK)

(72) Inventors: Cheng-Kai Huang, New Taipei (TW); Ming-Hsing Chung, New Taipei (TW); Bo-Hong Ma, New Taipei (TW); Chang-Hung Tien, New Taipei (TW)

(73) Assignee: CLOUD LIGHT TECHNOLOGY LIMITED, Hong Kong (HK)

( * ) Notice: Subject to any disclaimer, the term of this patent is extended or adjusted under 35 U.S.C. 154(b) by 278 days.

(21) Appl. No.: 17/381,217

(22) Filed: Jul. 21, 2021

(65) Prior Publication Data
US 2022/0155536 A1 May 19, 2022

Related U.S. Application Data

(60) Provisional application No. 63/114,535, filed on Nov. 17, 2020.

(51) Int. Cl.
*G02B 6/42* (2006.01)

(52) U.S. Cl.
CPC ............ *G02B 6/426* (2013.01); *G02B 6/4204* (2013.01)

(58) Field of Classification Search
CPC ...... G02B 6/426; G02B 6/4204; G02B 6/423; G02B 6/4244; G02B 6/4245; G02B 6/424; G02B 6/4246; G02B 6/4274; G02B 6/428

USPC .......................................................... 250/216
See application file for complete search history.

(56) References Cited

U.S. PATENT DOCUMENTS

| | | | | |
|---|---|---|---|---|
| 8,259,765 B2 * | 9/2012 | Rossi | ................... | H01S 5/02315 372/20 |
| 2007/0086494 A1 * | 4/2007 | Shoji | ................... | H01S 5/02212 372/36 |
| 2013/0032701 A1 * | 2/2013 | Chen | ...................... | H01L 33/486 438/460 |
| 2021/0364697 A1 * | 11/2021 | Inaba | .................... | H01S 5/0656 |

* cited by examiner

*Primary Examiner* — Georgia Y Epps
*Assistant Examiner* — Mai Thi Ngoc Tran

(57) ABSTRACT

A light receiving and emitting module includes a sub-mount platform, a photoelectrical conversion component, a lens and a base. The sub-mount platform is made of silicon-based material and has first and second contact surfaces. The photoelectrical conversion component is disposed on the first contact surface. The lens is disposed on the second contact surface. The sub-mount platform is disposed on one side of the base. The first contact surface and second contact surface have therebetween a height difference, such that the photoelectrical conversion component matches the center of the lens. Further provided is a light receiving and emitting device including the light receiving and emitting module, a printed circuit board and a plurality of conducting wires. The conducting wires are electrically connected to the photoelectrical conversion component and printed circuit board. The conducting wires are disposed on at least two sides of the light receiving and emitting module.

5 Claims, 3 Drawing Sheets

LIGHT RECEIVING AND EMITTING DEVICE

CROSS-REFERENCE TO RELATED APPLICATION

This non-provisional application claims priority under 35 U.S.C. § 119(e) on U.S. provisional patent application No. 63/114,535 filed on Nov. 17, 2020, the entire contents of which are hereby incorporated by reference.

BACKGROUND OF THE INVENTION

1. Field of the Invention

The present disclosure relates to light receiving and emitting modules and light receiving and emitting devices, and in particular to a light receiving and emitting module and a light receiving and emitting device which enhance optical coupling efficiency.

2. Description of the Related Art

Compared with cables, optical fibers manifest low energy loss rate in electrical signal transmission; thus, optical fibers, coupled with photoelectrical conversion components, are widely used in communications. Transmission of signals with a light receiving and emitting module requires a laser emitting member for converting electrical signals into light signals, and then the light signals undergo focusing with a lens before being transmitted toward the end of optical fiber. After that, the light signals are transmitted to another end via optical fiber and then transmitted from the optical fiber to another lens before being emitted and focused. Finally, a light signal receiving component converts the light signals into electrical signals. Thus, overall tolerance of the light receiving and emitting module is important. If the overall tolerance is overly large, the light receiving and emitting module cannot couple with optical fiber, and thus the light signals cannot be correctly inputted to optical fiber or outputted from optical fiber. Referring to FIG. 1, regardless of the magnitude of the tolerance, the intensity of the inputted or outputted light signals is inevitably affected.

A conventional method of assembling a conventional light receiving and emitting module is illustrated by FIG. 2, which shows that light emitting component A (or light signal receiving component) is mounted on sub-mount platform B, wherein sub-mount platform B and lens C are each mounted on base D. Mounting light emitting component A (or light signal receiving component) on sub-mount platform B causes tolerance, and mounting sub-mount platform B on base D also causes tolerance, and so does mounting lens C on base D. The base D has overly high manufacturing tolerance; as a result, lens C cannot be aligned with light emitting component A (or light signal receiving component) to effect focusing. The base D is usually made of mechanically processed metal, and its manufacturing tolerance mostly falls within the range of +/−50 μm. Hence, upon completion of its assembly, the light receiving and emitting module has enormous cumulative tolerance and thus cannot couple with optical fibers effectively. Therefore, the light receiving and emitting module has low yield and poor productivity.

BRIEF SUMMARY OF THE INVENTION

To overcome the aforesaid drawbacks of the conventional light receiving and emitting module and light receiving and emitting device, it is an object of the present disclosure to provide a light receiving and emitting module and a light receiving and emitting device which enhance optical coupling efficiency.

To achieve at least the above objective, the present disclosure provides a light receiving and emitting module, comprising: a sub-mount platform being made of a silicon-based material and having a first contact surface and a second contact surface; a photoelectrical conversion component disposed on the first contact surface; a lens disposed on the second contact surface; and a base, wherein the sub-mount platform is disposed on one side of the base. The first contact surface and the second contact surface have therebetween a height difference, such that the photoelectrical conversion component matches the center of the lens.

In an embodiment of the present disclosure, the sub-mount platform is staircase-shaped.

In an embodiment of the present disclosure, the base has an optical fiber fixing portion which has an optical fiber receiving hole and faces the sub-mount platform.

In an embodiment of the present disclosure, the photoelectrical conversion component is a light emitting component.

In an embodiment of the present disclosure, the photoelectrical conversion component is a light signal receiving component.

The present disclosure further provides a light receiving and emitting device comprising: the light receiving and emitting module; a printed circuit board; and a plurality of conducting wires electrically connected to the photoelectrical conversion component and the printed circuit board and disposed on at least two sides of the light receiving and emitting module.

In an embodiment of the present disclosure, the printed circuit board has a dent portion, whereas the light receiving and emitting module is disposed at the dent portion and its three sides adjoin the printed circuit board.

According to the present disclosure, the light receiving and emitting module and light receiving and emitting device have advantages described below. The photoelectrical conversion component and lens are each disposed on the sub-mount platform which has small manufacturing tolerance, such that the alignment and optical coupling between the photoelectrical conversion component and lens is controlled effectively and precisely. The alignment between the photoelectrical conversion component and lens is not affected by the base whose manufacturing tolerance is high; such that cumulative tolerance of components in the light receiving and emitting module decreases, so as to enhance the precision of assembly of the light receiving and emitting module, enhance the efficiency of its coupling to optical fiber, and greatly increase overall yield. In addition, the optical coupling space of optical fiber coupled to the light receiving and emitting module reduces, such that the overall size of the light receiving and emitting module reduces, thereby achieving miniaturization.

DETAILED DESCRIPTION OF THE INVENTION

To facilitate understanding of the object, characteristics and effects of this present disclosure, embodiments together with the attached drawings for the detailed description of the present disclosure are provided.

Figure 3:
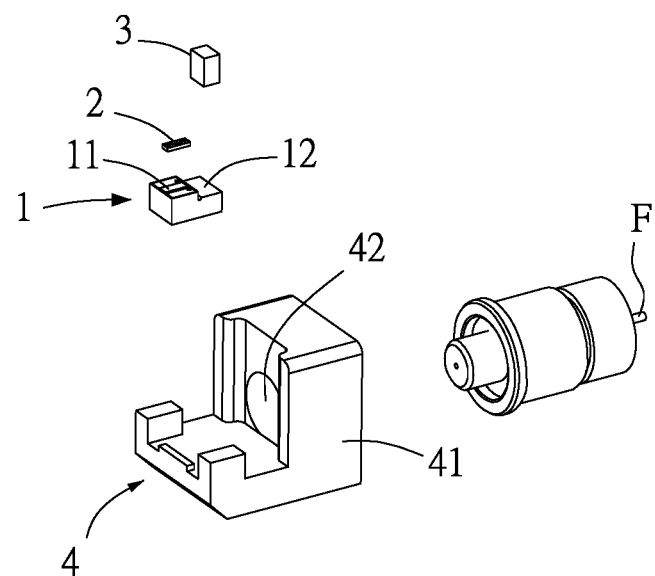
FIG. 3 is a perspective view of a light receiving and emitting module according to an embodiment of the present disclosure.
Figure 4:
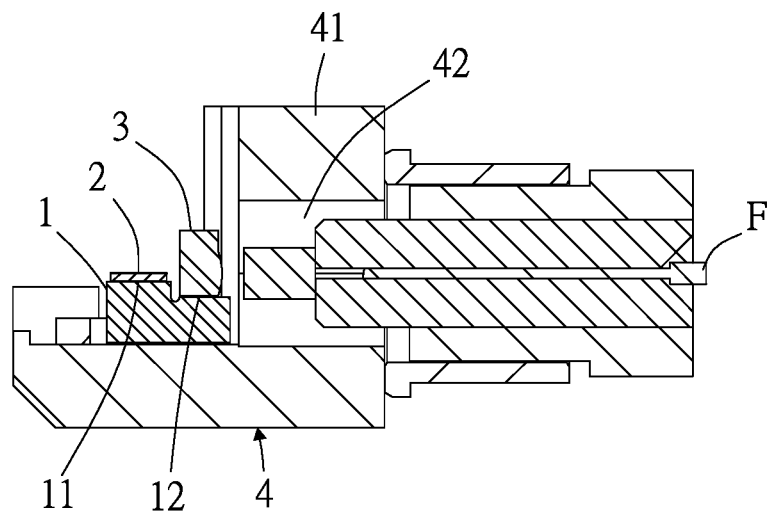
FIG. 4 is a longitudinal cross-sectional view of the light receiving and emitting module according to an embodiment of the present disclosure.

Referring to FIG. 3 and FIG. 4, in an embodiment of the present disclosure, a light receiving and emitting module 100 comprises a sub-mount platform 1, a photoelectrical conversion component 2, a lens 3 and a base 4.

The sub-mount platform 1 is made of a silicon-based material and manufactured by a semiconductor process to reduce manufacturing tolerance. Preferably, in this embodiment, the manufacturing tolerance of sub-mount platform 1 is controlled to fall within the range of +/−30 μm. The sub-mount platform 1 has a first contact surface 11 and a second contact surface 12 which photoelectrical conversion component 2 and lens 3 are disposed on, respectively.

The photoelectrical conversion component 2 is disposed on first contact surface 11. The photoelectrical conversion component 2 is a light emitting component, such as a laser component, which converts inputted electrical signals into light signals and emits the light signals toward the end of optical fiber F. The photoelectrical conversion component 2 may also be a light emitting component, such as photodiode (PD), for receiving the light signals emitted by the end of optical fiber F and converting the light signals into electrical signals.

The lens 3 is disposed on second contact surface 12. The first contact surface 11 and second contact surface 12 have therebetween a height difference, such that photoelectrical conversion component 2 matches the center of lens 3. In this embodiment, sub-mount platform 1 is staircase-shaped, whereas first contact surface 11 and second contact surface 12 are staircase-shaped. The second contact surface 12 is slightly lower than first contact surface 11; thus, lens 3, which is larger and higher, is aligned with the thin photoelectrical conversion component 2. However, the present disclosure is not limited thereto. Alternatively, if photoelectrical conversion component 2 is larger than lens 3, first contact surface 11 will be slightly lower than second contact surface 12. In a variant embodiment, sub-mount platform 1 is not necessarily staircase-shaped, whereas second contact surface 12 is the surface of a recess and thus centrally matches photoelectrical conversion component 2 when fitted together.

The sub-mount platform 1 is disposed on one side of base 4 to mount optical fiber F in place.

According to the present disclosure, photoelectrical conversion component 2 and lens 3 are each disposed on sub-mount platform 1 which has small manufacturing tolerance, such that the alignment and optical coupling between photoelectrical conversion component 2 and lens 3 is controlled effectively and precisely. The alignment between photoelectrical conversion component 2 and lens 3 is not affected by the base 4 whose manufacturing tolerance is high; such that cumulative tolerance of components in light receiving and emitting module 100 decreases, so as to enhance the precision of assembly of light receiving and emitting module 100, enhance the efficiency of its coupling to optical fiber, and greatly increase overall yield. In addition, the optical coupling space of optical fiber F coupled to light receiving and emitting module 100 reduces, such that the overall size of light receiving and emitting module 100 reduces, thereby achieving miniaturization.

Referring to FIG. 3 and FIG. 4, base 4 has an optical fiber fixing portion 41. The optical fiber fixing portion 41 has an optical fiber receiving hole 42 and faces sub-mount platform 1. The optical fiber receiving hole 42 receives optical fiber F and positions it in place; such that light receiving and emitting module 100 and optical fiber F undergo optical coupling precisely. Thus, the end of optical fiber F is fixed to base 4 by performing a precise drilling process on light receiving and emitting module 100 to reduce assembly errors, as opposed to the prior art (adhering together otherwise discrete parts and components) illustrated by FIG. 2.

Figure 5:
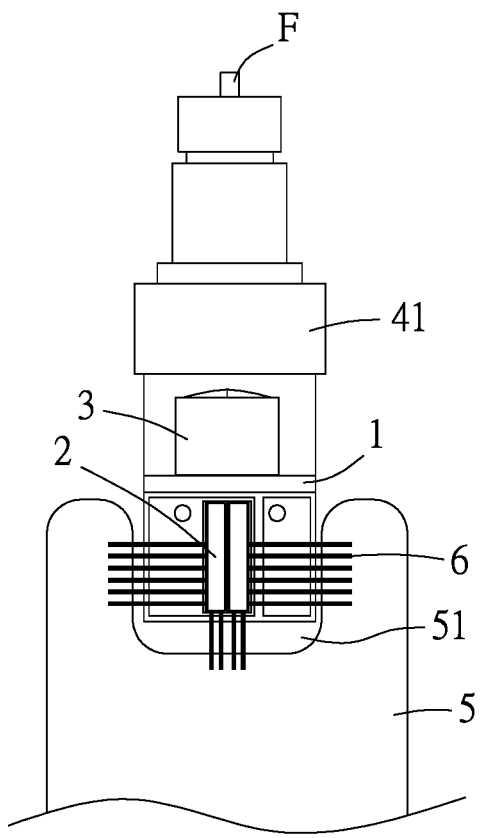
FIG. 5 is a top view of the light receiving and emitting device according to an embodiment of the present disclosure.

Referring to FIG. 5, the present disclosure further provides a light receiving and emitting device 200 which comprises the light receiving and emitting module 100, a printed circuit board 5 and a plurality of conducting wires 6.

The printed circuit board 5 is a flexible printed circuit (FPC) structurally fine enough to operate in conjunction with the millimeter-scale light receiving and emitting module 100. However, the present disclosure is not limited thereto.

The conducting wires 6 are electrically connected to photoelectrical conversion component 2 and printed circuit board 5; thus, printed circuit board 5 provides electrical signals to photoelectrical conversion component 2 or receives electrical signals from photoelectrical conversion component 2. The conducting wires 6 (wire bonding in this embodiment) are disposed on at least two sides of light receiving and emitting module 100.

Figure 1:
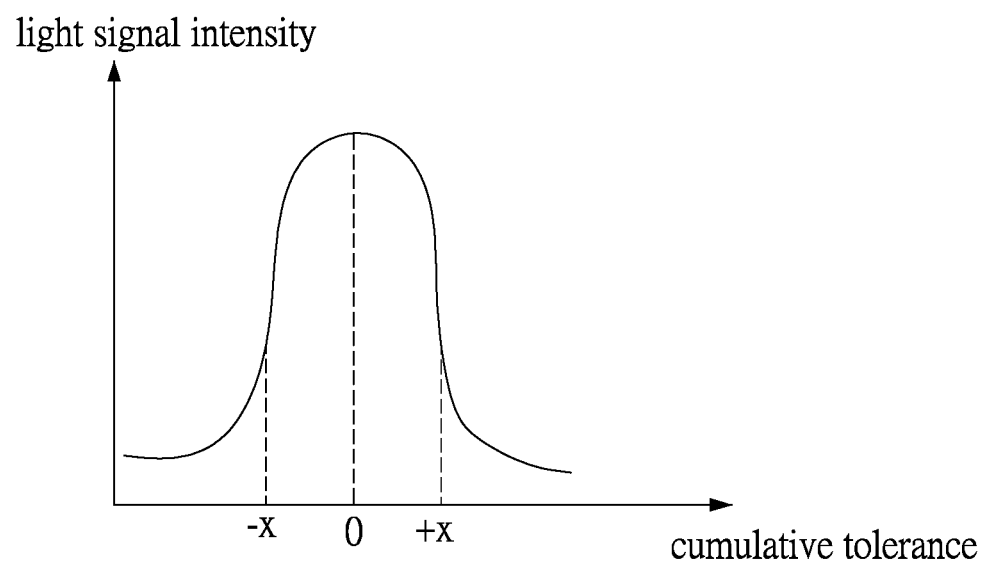
FIG. 1 (PRIOR ART) is a graph of light signal intensity vs. cumulative tolerance.
Figure 2:
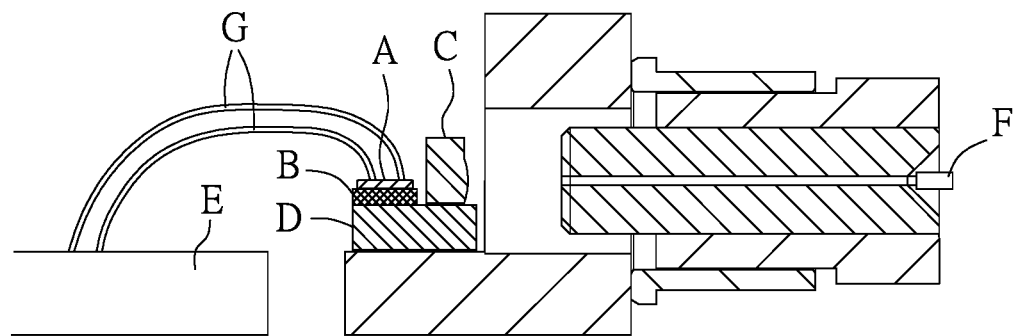
FIG. 2 (PRIOR ART) is a longitudinal cross-sectional view of a light receiving and emitting module.

Owing to the miniaturization of light receiving and emitting module 100, not only does one side of light receiving and emitting module 100 connect to optical fiber F, but the other sides of light receiving and emitting module 100 are also electrically connected to printed circuit board 5 by conducting wires 6, so as to reduce the length of the conducting wires 6. Referring to FIG. 2, circuit board E is electrically connected to one single side of photoelectrical conversion component A only by conducting wires G. Thus, conducting wires G is of a great length. According to the present disclosure, multiple sides of light receiving and emitting device 200 are electrically connected to photoelectrical conversion component 2 and printed circuit board 5; thus, not only does the flexibility of providing conducting wires 6 increase, but the required length of conducting wires 6 also decreases, so as to render signal transmission satisfactory and enhance reliability.

Preferably, in this embodiment, printed circuit board 5 has a dent portion 51. The light receiving and emitting module 100 is disposed at dent portion 51, and its three sides adjoin printed circuit board 5. However, the present disclosure is not limited thereto. The way of connecting light receiving and emitting module 100 and printed circuit board 5 is subject to changes as needed.

While the present disclosure has been described by means of specific embodiments, numerous modifications and variations could be made thereto by those skilled in the art without departing from the scope and spirit of the present disclosure set forth in the claims.

What is claimed is:

1. A light receiving and emitting device, comprising:
a light receiving and emitting module comprising:
   a sub-mount platform being made of a silicon-based material and having a first contact surface and a second contact surface;
   a photoelectrical conversion component disposed on the first contact surface;
   a lens disposed on the second contact surface; and
   a base, wherein the sub-mount platform is disposed on a side of the base;
a printed circuit board having a dent portion; and
a plurality of conducting wires electrically connected to the photoelectrical conversion component and the printed circuit board and disposed on at least two sides of the light receiving and emitting module,
wherein the light receiving and emitting module is disposed at the dent portion and adjacent to the printed circuit board on three sides,
wherein the first contact surface and the second contact surface have therebetween a height difference to allow the photoelectrical conversion component to match a center of the lens.

2. The light receiving and emitting device of claim 1, wherein the sub-mount platform is staircase-shaped.

3. The light receiving and emitting device of claim 1, wherein the base has an optical fiber fixing portion, and the optical fiber fixing portion has an optical fiber receiving hole and faces the sub-mount platform.

4. The light receiving and emitting device of claim 1, wherein the photoelectrical conversion component is a light emitting component.

5. The light receiving and emitting device of claim 1, wherein the photoelectrical conversion component is a light signal receiving component.

* * * * *